Figure 1:
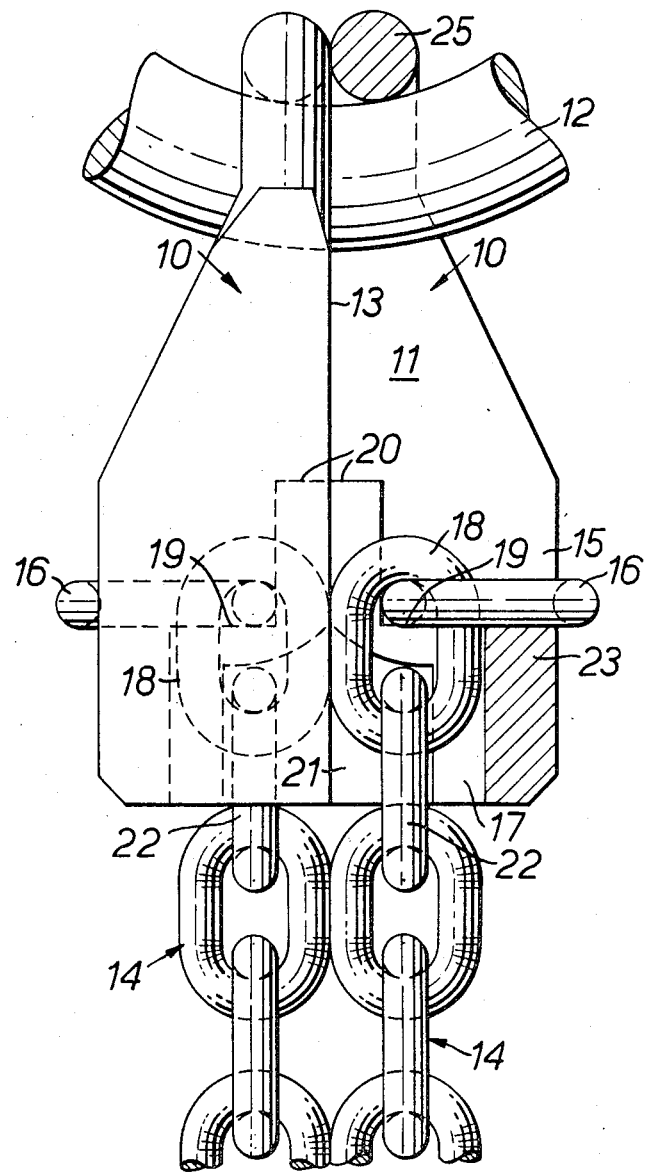

United States Patent [19]
Smith

[11] 3,724,035
[45] Apr. 3, 1973

[54] CHAIN RETAINING DEVICE

[75] Inventor: Joseph Cyril Smith, Stocksbridge, England

[73] Assignee: British Steel Corporation, London, England

[22] Filed: Jan. 29, 1971

[21] Appl. No.: 110,808

[30] Foreign Application Priority Data

Feb. 6, 1970 Great Britain..................5,774/70
June 4, 1970 Great Britain..................27,041/70

[52] U.S. Cl....................................24/116 C, 294/74
[51] Int. Cl.................................................F16g 15/04
[58] Field of Search..........................24/116; 294/74

[56] References Cited

UNITED STATES PATENTS

| | | |
|---|---|---|
| 3,582,125 | 6/1971 | Collins....................294/74 |
| 1,892,411 | 12/1932 | Segimon..................24/116 |
| 2,835,528 | 5/1958 | McCarthy................294/74 |
| 1,303,521 | 5/1919 | Sylvester.................24/116 |
| 2,630,610 | 3/1953 | Lock.......................24/116 |

FOREIGN PATENTS OR APPLICATIONS

| | | |
|---|---|---|
| 3,048 | 2/1915 | Great Britain..........24/116 |
| 1,135,182 | 12/1968 | Great Britain..........294/74 |

*Primary Examiner*—Bernard A. Gelak
*Attorney*—Bacon & Thomas

[57] ABSTRACT

A chain securing device consists of two identical blocks connected to a crane hook ring. Each block has an opening through which chains can be passed. The openings have slot portions shaped to retain the chain ends. A chain can be inserted into the device and secured with any desired link retained in the opening so that the effective length of the chain can be adjusted at will. The chain can also easily be detached from the device.

11 Claims, 4 Drawing Figures

INVENTOR
JOSEPH CYRIL SMITH
BY *Bacon & Thomas*
ATTORNEYS

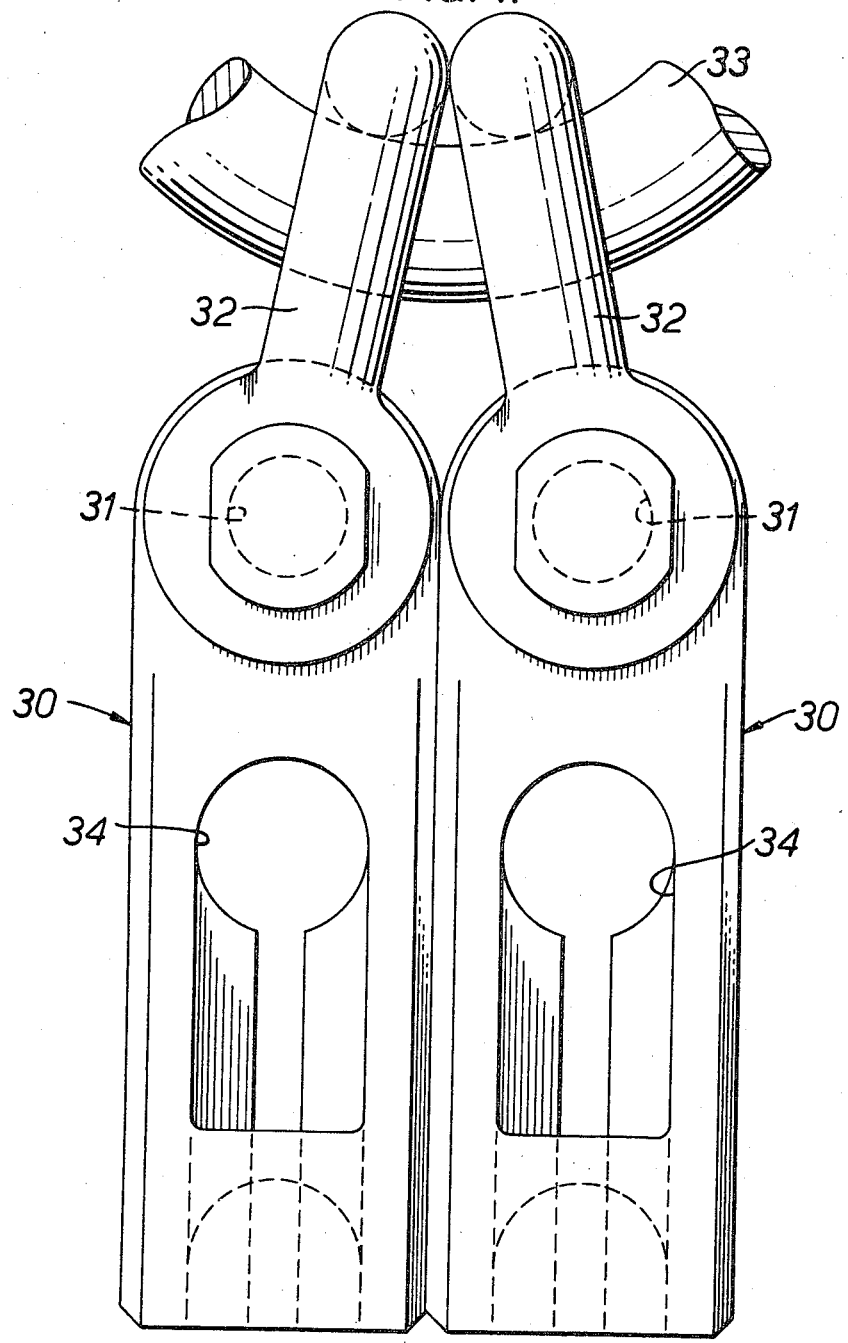

CHAIN RETAINING DEVICE

It is common practice where loads have to be lifted to use a chain connected to a ring at one end and a hook at the other end. The ring can be connected to a crane, and the chain can be passed around the load and the hook then engaged on the ring.

Sometimes the chain has been connected to the ring or hook by welded connecting links which need heat treatment. Such treatment requires skill as well as expensive equipment. A known alternative but less positive method is to use mechanical joining links.

An object of this invention is to allow easy attachment and detachment of a chain to a load bearing member.

According to the present invention there is provided a chain securing device including a block having anchoring means for connecting it to a load bearing member, said block having an opening therein through which a chain can be passed, said opening having a first slot portion wider than the width of a chain link adapted to receive one link, and a second slot portion narrower than the width of a link but wider than the thickness of a link adapted to receive the next adjacent link, and in which the walls of the opening where it merges from the first to the second portion form shoulders to transmit the load from the first mentioned link to the block when the chain is in tension. Preferably the block includes retaining means to retain the link in the first portion against displacement off the shoulder and back out of the opening.

A chain can be inserted into such a device and secured with any desired link retained in the first slot portion, so that the length of the chain can be adjusted at will. Furthermore the chain can easily be detached from the device.

Preferably there is a third slot portion which is wider (in the direction at right angles to the width of the second slot portion) than the width of a link and which is adapted to receive the link adjacent to the link in the second slot portion. The third portion reduces still further any likelihood of the chain becoming detached accidentally.

Although the first slot portion could be shaped so that the link therein is in line with the link in the second slot portion, preferably the first slot portion is so shaped that in use the link therein can lie in a plane substantially at right angles to the length of the link in the second portion.

The retaining means preferably consisting of two projections, which may be integral with the block, upstanding one from each shoulder. One face of each projection is preferably at right angles to its shoulder and preferably projects from the shoulder by an amount greater than twice the thickness of a link.

The anchoring means can be of any desired form, for example, a hole to receive a bolt. Preferably a ring of any desired shape, e.g., a D-ring or a circular ring, passes through an opening in the block. Preferably a second similar block is connected to the first block.

Where there are two blocks, there may be a separate ring, such as a D-ring, passing through an opening in each block, and a further ring passing through the two separate rings. This arrangement enables the openings through which the chains can be passed through the blocks to be disposed so that the direction in which the chains are passed extend in separate planes. This has the advantage that the chain can be removed from one block without having to separate the two blocks from each other.

More than two blocks can be connected together on a ring.

Figure 2:
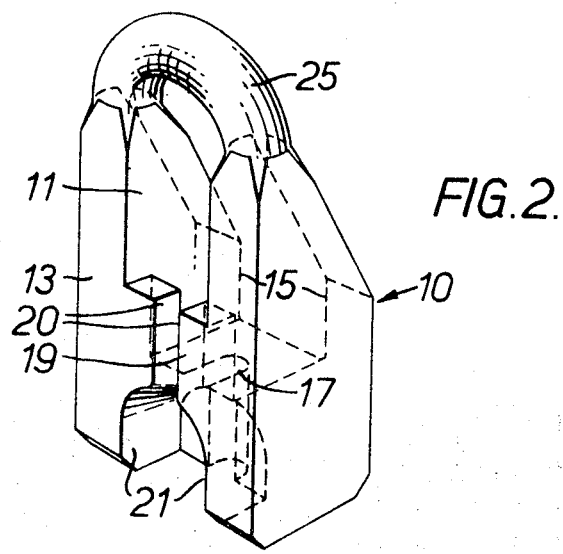
Figure 3:
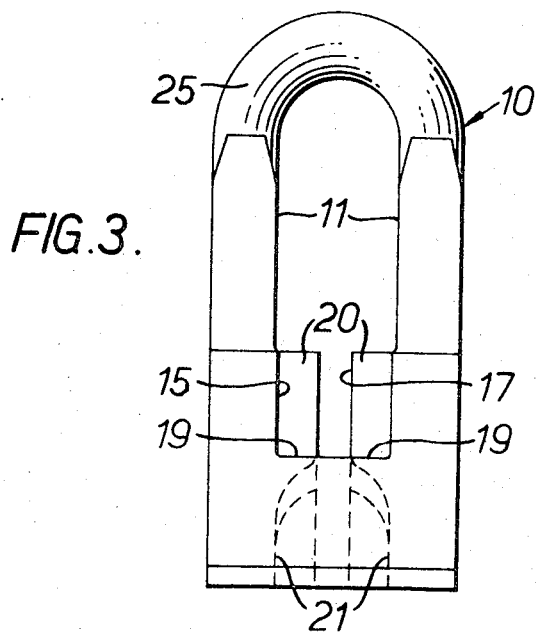

In the accompanying drawings:

FIG. 1 shows a side view, partly in section, of one embodiment of a chain securing device in accordance with the invention, FIG. 2 is a perspective view of a block forming part of the device of FIG. 1, FIG. 3 is a side view of the block of FIG. 1, and FIG. 4 shows a side view of another embodiment of a chain securing device.

The chain securing device shown in FIG. 1 consists of two identical cast steel blocks 10 each having an opening 11 through which passes a circular crane hook ring 12. The blocks 10 each have a flat front face 13 and they are connected together by being mounted on the ring 12 with faces 13 facing one another. The upper end of the block 10 has an inverted U-shaped bar 25 which closes the opening 11.

A chain 14 consisting of a series of identical oval links can be passed right through the opening 11 in the block with the chain entirely surrounded by the block. The opening 11 has slot portions shaped to retain the chain 14. As can be seen in FIGS. 2 and 3 the opening 11 has a first slot portion 15 wider than the width of a chain link and adapted to receive the link 16 lying in a horizontal plane when the block 10 is vertical. The opening 11 has a second slot portion 17 narrower (as can be seen in FIG. 3) than the width of a link but wider than the thickness of a link and adapted to receive the next adjacent link 18. The horizontal dimensions of the slot portion 17 as seen in FIG. 1 is greater than the width of a link. The walls of the opening 11 where it merges from the first portion 15 to the second portion 17 form shoulders 19 to transmit the load from the link 16 to the block 10 when the chain 14 is in tension.

The block 10 also includes a projection 20 upstanding from each shoulder 19 with one face of the projection 20 flush with the face 13 of the block. The projections 20 project upwardly from the shoulders 19 by an amount greater than twice the thickness of a link and serve as retaining means to retain the link 16 in the first slot portion 15 against displacement off the shoulders 19 in a direction transverse to the tension in the chain 14 and back out of the opening 11.

The opening 11 has a third slot portion 21 which is wider (in the direction at right angles to the width of the second portion 17, i.e., as seen in FIG. 3) than the width of a link and adapted to receive the link 22 that is adjacent to the link 18 in the second slot potion 17. The third slot portion 21 is located at the lower end of the block and is partly curved at its upper end to match the shape of the upper end of the link 22.

In use the crane hook ring 12 can be connected to a crane and a chain 14 passed through the openings 11 in the two blocks 10 until the chain forms a sling of the desired length. Thus a single chain can be used where normally it has been necessary to have available several chains of different lengths for lifting loads of different sizes. Although in FIG. 1 the chain 14 is shown with the end links 16 in the first slot portions 15 any link may be disposed in the slot portion 15.

When the sling is under tension the shoulders 19 transmit the tension from the link 16 to the block 10 and the projections 20 ensure that the chain 14 cannot be displaced back out of the opening 11 and come off the block due to an outward pull on the chain to one side as seen in FIG. 1. The part 23 of the block 10 which interconnects the two sides of the block ensures that the chain 14 cannot come off due to an outward pull on the chain to the other side as seen in FIG. 1. The location of the links 22 in the slot portions 21 ensures that any outward pull on the chain into or out of the plane of the drawing of FIG. 1 will not dislodge the links 18 and 16.

The device shown in FIG. 4 consists of two identical cast steel blocks 30 each having an opening 31 through which passes the straight part of a separate D-ring 32. A circular crane hook ring 33 passes through the two separate D-rings 32 to connect the two blocks together.

Each block 30 has an opening 34 through which chains can be passed, and the opening 34 has slot portions shaped to retain the chains similar to the slot portions of the device illustrated in FIGS. 1 to 3. However, in contrast to the device illustrated in FIGS. 1 to 3 the openings 34 are disposed so that the direction in which the chains are passed through the block extend in separate planes even when the blocks 30 are in contact and hang down normally from the ring 33. This enables the end of the chains to be removed easily from the blocks 30 without having to separate the blocks 30. In other words the provision of the D-rings 32 has rotated the blocks through 90° relative to the crane ring.

It will be seen that in contrast to the device illustrated in FIGS. 1 to 3 the openings 31 for the rings 32 are separate from the openings 34 for the chain ends.

With either the device shown in FIG. 1 or 4, it is possible to use a chain with a hook at one end instead of using a plain length of chain. The free end of the chain can be secured in either block so that the chain is of the desired length and the hook can be engaged on the crane ring.

A particular advantage of the invention is when it is necessary to pull a chain out from beneath a load that has been lowered to the ground or on to the back of a truck or down into a railway wagon. The hook or other termination of conventional chains can become caught which sometimes results in damage to the material being moved or to the truck or wagon. With a device according to the invention a free end of chain can be released and then pulled out from beneath the load.

The ring and blocks described above should be capable of use long after the chain has become worn or damaged.

The invention thus provides a chain securing device which is safe and economical and permits rapid and easy removal of the chain and also adjustment of the length of the chain.

We claim:

1. A chain securing device, comprising: a block having front and back faces and an opening through which a chain may be freely passed, said block having anchoring means in open communication with said opening in which a chain may be secured at any desired link in the chain, said anchoring means comprising first, second and third interconnected slot portions for accommodating adjacent links in a chain, and means at one end of the block for receiving a ring or hook for suspending the block, said first slot portion being wider than the width of a link to be accommodated therein and extending inwardly from the said back face, said third slot portion being wider than the width of a link to be accommodated therein and being located at the other end of said block and opening into said front face, said second slot portion lying contiguous with and located between the first and third slot portions and being narrower than the width but wider than the thickness of a link to be accommodated therein, the bottom wall of said first and third slot portions lying in planes substantially normal to one another, the bottom wall of the first slot portion defining shoulders at the contiguity between the bottom wall of the first and second slot portions whereby to transmit any load from a chain link accommodated in the first slot portion onto the block when the portion of the chain depending from a link accommodated in the second slot portion is in tension, and a pair of opposed projections rigid with the block upstanding from said shoulders and extending toward said one end of the block and lying along said front face, said projections being spaced apart a distance greater than the thickness but less than the width of a link to be accommodated therebetween and forming at least a portion of said second slot portion, said projections providing retaining means for engaging a link accommodated in the first slot portion and thereby restraining chain displacement off the anchoring means.

2. A chain securing device according to claim 1 wherein the projections are upstanding from the shoulders for a distance greater than twice the thickness of a link to be accommodated in the first slot portion.

3. A chain securing device according to claim 1, including a ring passing through the opening defined in the said block.

4. A chain securing device according to claim 3, wherein the ring lies in a plane containing the common axes of the three slots.

5. A chain securing device according to claim 4, including two of the said blocks suspended on the said ring, the front face of said blocks including co-planar surfaces containing the second and third slots whereby in free suspension chains depending from the blocks extend alongside one another in a common plane containing the axes of the slots.

6. A chain securing device according to claim 1, in which the opening defined in the block just accommodates the chain, and the means for suspending the block includes a ring support member mounted on said block for accommodating a ring in a plane normal to a plane containing the common axes of the three slots.

7. A chain securing device according to claim 6, in which the ring support member is pivotally mounted in the said block.

8. A chain securing device according to claim 7, including two of the said blocks suspended on the said ring.

9 A chain securing device according to claim 1 in which said block is a monolithic cast metal block.

10. A chain securing device according to claim 9, including a pair of said blocks supported on, and freely dependent from, a common ring.

11. A chain securing device according to claim 1 in which the upper end portion of said third slot portion is curved to substantially match the shape of a link to be accommodated therein.

* * * * *